UNITED STATES PATENT OFFICE 2,335,262

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application November 14, 1941, Serial No. 419,082

7 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under conditions just mentioned is of significant value in removing impurities, particularly inorganic salts, from pipeline oil.

The demulsifier or demulsifying agent employed in our process, consists of a quaternary compound of the pyridine series of the kind hereinafter described in detail. Members of the pyridine series suitable as reactants include pyridine, alkylated derivatives of pyridine, particularly alkylated derivatives in which the alkyl radical contains three carbon atoms or less, and especially methylated pyridines, i. e., pyridines in which one, two, or three methyl groups have been substituted in the nucleus, such as picolines, lutidines and collidines. Also suitable as reactants are the comparable quinolines and isoquinolines, along with C-methyl homologues thereof. Coal tar bases represent mixtures of suitable heterocyclic materials which may be used as such, or after suitable purification, without separation into the individual components. Specifically, then, the compounds herein contemplated as demulsifiers, consist of the quaternary nitrogen products obtained by reacting one mole of hydroxy compounds (hydroxylated esteramides) of the following formula:

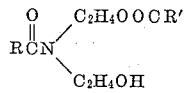

in which RCO is the acyl radical containing not more than 5 carbon atoms and R'CO is the acyl radical of a detergent-forming acid having at least 8 and not more than 32 carbon atoms, with one mole of a heterocyclic compound of the pyridine series selected from the group consisting of pyridine, quinoline, isoquinoline, and C-methyl homologues thereof, in the presence of substantially one mole of halogen hydride at an elevated temperature, the heterocyclic compound being applied in an amount substantially equivalent to the halogen hydride, and usually in excess thereof, i. e., the reaction being conducted in the presence of the free base.

The mechanical procedure employed in the manufacture of such compounds is substantially the same as used in connection with another type of reaction involving the formation of quaternery compounds by the elimination of water. See U. S. Patent No. 2,242,211, dated May 20, 1941, to Haack. See also our co-pending application for patent Serial No. 401,375, filed June 7, 1941, now U. S. Patent No. 2,273,181, dated February 17, 1942, and our co-pending applications Serial Numbers 415,762, 415,763, 415,764, 415,765, and 415,766, filed October 20, 1941. The above mentioned co-pending application Serial No. 415,762 is now U. S. Patent No. 2,290,417, dated July 21, 1942.

It is well known that certain monocarboxy organic acids containing eight carbon atoms or more, and not more than 32 carbon atoms, are characterized by the fact that they combine with alkali to produce soap or soap-like materials. These detergent-forming acids include fatty acids, resin acids, petroleum acids, etc. For the sake of convenience, these acids will be indicated by the formula R'.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids but also acids obtained by the oxidation of wax, paraffin, etc. Such acids may have as many as 32 carbon atoms. For instance, see U. S. Patent No. 2,242,837, dated May 20, 1941, to Shields.

Although any of the high molal monocarboxy acids can be converted into esteramides of the kind described, by conventional procedure, it is our preference to employ hydroxylated esteramides derived from higher fatty acids, rather than petroleum acids, rosin acids, and the like. We have found that by far the most effective demulsifying agents are obtained from unsaturated fatty acids having 18 carbon atoms. Such unsaturated fatty acids include the higher fatty acids, such as oleic acid, ricinoleic acid, linoleic acid, linolenic acid, etc. One may employ mixed fatty acids, as, for example, the fatty acids obtained by hydrolysis of cottonseed oil, soyabean oil, corn oil, etc. Our preferred demulsifier is obtained from unsaturated fatty acids, and more especially, unsaturated fatty acids containing a hydroxyl radical or unsaturated fatty acids which have been subjected to oxidation or oxyalkylation, such as oxyethylation.

The esteramides of the kind herein described and which are employed as reactants to combine with pyridine hydrochloride or the like, may be obtained in any conventional manner. They are usually derived from the low molal acids themselves; but if desirable, the functional equivalents, such as the anhydrides, acyl chlorides, or other derivatives, may be employed. Suitable acids include, of course, acetic acid, propionic acid, butyric acid, valeric acid, etc. The amide of such low molal acid may be treated with an oxyalkylating agent, such as ethylene oxide, propylene oxide, butylene oxide, or the like, so as to produce a compound of the following type:

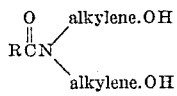

Actually, the alkylene radical might represent an equivalent divalent radical, in which the carbon atom chain is interrupted at least once by oxygen, as

Having obtained a bis(hydroxyalkyl)amide of the kind described, such compound can then be reacted in a conventional manner with a high molal acid or its equivalent, to give an esteramide, in other words, a compound of the following type:

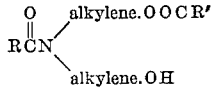

A procedure that is frequently more readily adaptable is simply the reaction between a low molal acid, such as acetic acid, and a material of the kind exemplified by diethanolamine, dipropanolamine, or the like. For the sake of brevity, reference hereafter will be made largely to diethanolamine and acetic acid, although other suitable reactants have already been described. The method of manufacturing esteramides is so well known that no further description is required; but for convenience, the following example is given in substantially verbatim form, as it appears in U. S. Patent No. 2,238,928, dated April 22, 1941, to Cahn and Harris.

*Example A*

(1) 224 grams of methyl acetate (3 moles) and 210 grams of diethanolamine (2 moles) were mixed together, two layers forming at first, the mixtures becoming a homogeneous mass after a short time. The mixture was refluxed for 19 hours at which time 90% of the diethanolamine had reacted. A portion of the reaction mixture was subjected to a vacuum of 6 millimeters at 60 degrees C., in order to drive off the volatile material, i. e., the unreacted methyl acetate and the methyl alcohol which was formed during the reaction. The residue, upon titration, showed a content of 4.64% of free diethanolamine. To 192.5 grams of this residue, 34.7 grams of methyl acetate were added and the mixture was refluxed for 3½ hours. The resulting reaction product was then freed from its low boiling constituents, i. e., the methyl alcohol and unreacted methyl acetate, by maintaining the mass at 70 degrees C., under a pressure of 6 millimeters. The residue contained approximately 0.8% of unreacted diethanolamine, based upon a determination of the alkalinity of said residue by titration. The product was a light yellow colored syrup, soluble in water, and contained a compound which was essentially the acetic acid amide of diethanolamine, having the following formula:

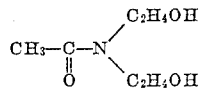

(2) One pound mole of the acetic acid amide of diethanolamine produced as described in part 1 hereof, and one pound mole of lauric acid were heated together for 15 minutes at approximately 200 degrees C., while passing carbon dioxide gas through the reaction mixture. At the end of the 15 minutes, the free lauric acid has decreased to 1.3%. The product was a yellow colored syrup, dispersible in water and having good emulsifying and dispersing properties. It could be salted out of its solution by the addition thereto of sodium chloride. The product consisted essentially of a compound having the following formula:

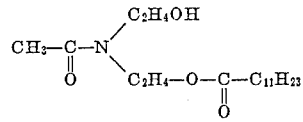

Illustrating somewhat similar types of reactions, see U. S. Patent No. 2,238,902, dated April 22, 1941, to Katzman and Harris, and also U. S. Patent No. 2,257,183, dated April 30, 1941, to Munz and Troskan.

Actually, in the manufacture of demulsifiers we have followed substantially the same procedure as above described for the manufacture of the esteramide, but have found that the most desirable compounds are obtained from unsaturated fatty acids, as previously described. Thus, we have substituted oleic acid, various mixed fatty acids, derived from unsaturated oils, such as teaseed oil, sunflower seed oil, or the like, for lauric acid in the above example. By reference to the aforementioned Haack patent, it is obvious that the formation of the quaternary compound may be indicated in the following manner:

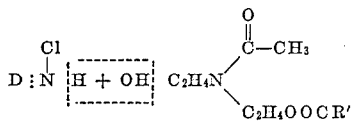

Instead of chlorine, some other halogen, such as bromine or iodine, may appear. D:N represents a heterocyclic compound of the kind previously described.

*Example 1*

One pound mole of the esteramide derived by reaction between equi-molar portions of bis(hydroxyethyl) acetamide and ricinoleic acid is heated with 1.05 moles of pyridine hydrochloride at 140–150° C., until clearly water-soluble. The time required is generally less than one hour, and the reaction is hastened by the presence of a small amount, 1% or 2%, of free pyridine. If desired, the reaction may be conducted at a slightly higher temperature, for instance, 160–

170° C. Instead of using pyridine hydrochloride, one may employ the hydrochloride of a fraction of pyridine bases, of the kind that 50% would distil over 140° C. or below, and 90% at 160° C. or below. Such selected pyridine bases are of the kind which are entirely water-soluble.

*Example 2*

The same procedure is followed as in Example 1, except that instead of employing an ester-amide derived from ricinoleic acid, one employs a comparable compound derived from oleic acid.

*Example 3*

The esteramide employed as a reactant for the manufacture of the final product is derived from linseed oil fatty acids instead of ricinoleic acid or oleic acid.

The manufacture of the above compounds is usually conducted with an excess of the pyridinium base halide, such as the hydrochloride, or hydrobromide, and usually, in the presence of a significant amount of the free pyridinium base itself. In many instances, however, there is no need to use an excess of the pyridinium base halide, and, in fact, no need to have present any of the free pyridinium base itself, or, at the most, only a trace of the free base.

Sometimes the reaction with the pyridinium compound can be catalyzed by the presence of small amount of soaps or alkalies. As is obvious, other monovalent anions may replace the halogen and serve as a functional equivalent.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, a cresol, anthacene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water-solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifer herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

We are aware that certain other derivatives similar to those herein contemplated may be derived from other esteramides, for instance, those having either an amino hydrogen atom present, or more than one hydroxyalkyl group, or a hydrocarbon radical, or two or more such functions. Note, for example, the following compounds described in the aforementioned Cahn and Harris patent:

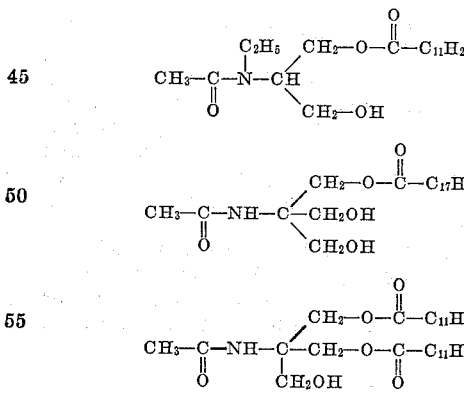

Other types not herein contemplated include derivatives of low molal polybasic carboxy acids, instead of acetic acid or the like.

Having thus described our invention, what we claim as new and desire to secure by Letters Patent is:

1. A process for breaking petroleum emulsions of the water-in-oil type, which consists in subjecting the emulsion to the action of the demulsifier comprising a chemical compound of the following formula type:

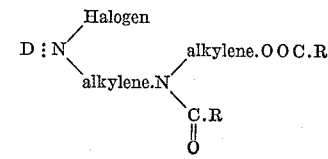

in which RCO is the acyl radical of a low molal monocarboxy acid having 5 carbon atoms or less, and R'CO is the acyl radical of a detergent-forming monocarboxy acid having at least 18 and not more than 32 carbon atoms; and D:N represents a radical of a heterocyclic compound of the pyridine series selected from the group consisting of pyridine, quinoline, isoquinoline, and C-linked methyl homologues thereof.

2. A process for breaking petroleum emulsions of the water-in-oil type, which consists in subjecting the emulsion to the action of a demulsifier comprising a chemical compound of the following formula type:

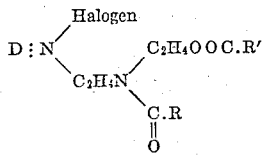

in which RCO is the acyl radical of a low molal monocarboxy acid having 5 carbon atoms or less, and R'CO is the acyl radical of a detergent-forming monocarboxy acid having at least 18 and not more than 32 carbon atoms; and D:N represents a radical of a heterocyclic compound of the pyridine series selected from the group consisting of pyridine, quinoline, isoquinoline, and C-linked methyl homologues thereof.

3. A process for breaking petroleum emulsions of the water-in-oil type, which consists in subjecting the emulsion to the action of a demulsifier comprising a chemical compound of the following formula type:

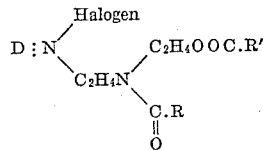

in which RCO is the acyl radical of a low molal monocarboxy acid having 5 carbon atoms or less, and R'CO is the acyl radical derived from a higher fatty acid having at least 8 and not more than 32 carbon atoms; and D:N represents a radical of a heterocyclic compound of the pyridine series selected from the group consisting of pyridine, quinoline, isoquinoline, and C-linked methyl homologues thereof.

4. A process for breaking petroleum emulsions of the water-in-oil type, which consists in subjecting the emulsion to the action of a demulsifier comprising a chemical compound of the following formula type:

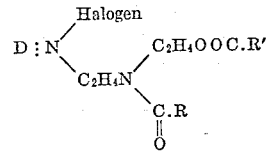

in which RCO is the acyl radical of a low molal monocarboxy acid having 5 carbon atoms or less, and R'CO is the acyl radical derived from a fatty acid having 18 carbon atoms; and D:N represents a radical of a heterocyclic compound of the pyridine series selected from the group consisting of pyridine, quinoline, isoquinoline, and C-linked methyl homologues thereof.

5. A process for breaking petroleum emulsions of the water-in-oil type, which consists in subjecting the emulsion to the action of a demulsifier comprising a chemical compound of the following formula type:

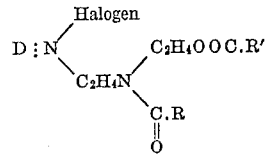

in which RCO is the acyl radical of a low molal monocarboxy acid having 5 carbon atoms or less and R'CO is the acyl radical derived from an unsaturated fatty acid having 18 carbon atoms; and D:N represents a radical of a heterocyclic compound of the pyridine series selected from the group consisting of pyridine, quinoline, isoquinolines, and C-linked methyl homologues thereof.

6. A process for breaking petroleum emulsions of the water-in-oil type, which consists in subjecting the emulsion to the action of a demulsifier comprising a chemical compound of the following formula type:

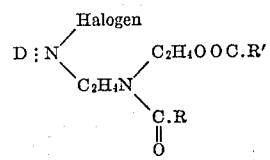

in which RCO is the acyl radical of a low molal monocarboxy acid having 5 carbon atoms or less, and R'CO represents a ricinoleyl radical; and D:N represents a radical of a heterocyclic compound of the pyridine series selected from the group consisting of pyridine, quinoline, isoquinoline, and C-linked methyl homologues thereof.

7. A process for breaking petroleum emulsions of the water-in-oil type, which consists in subjecting the emulsion to the action of a demulsifier comprising a chemical compound of the following formula type:

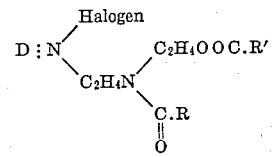

in which RCO is the acyl radical of a low molal monocarboxy acid having 5 carbon atoms or less, and R'CO represents a ricinoleyl radical; and D:N represents a radical of a heterocyclic compound of the pyridine series selected from the group consisting of pyridine, quinoline, isoquinoline, and C-linked methyl homologues thereof, and in which the halogen is chlorine.

MELVIN DE GROOTE.
BERNHARD KEISER.